(12) United States Patent
Smay

(10) Patent No.: US 7,494,132 B2
(45) Date of Patent: Feb. 24, 2009

(54) ROLL CONTROL ACTUATOR WITH PISTON ASSEMBLY

(75) Inventor: Eric A. Smay, Warren, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 470 days.

(21) Appl. No.: 11/169,057

(22) Filed: Jun. 28, 2005

(65) Prior Publication Data

US 2006/0290079 A1    Dec. 28, 2006

(51) Int. Cl.
    *B60G 17/015* (2006.01)

(52) U.S. Cl. .............. 280/5.508; 280/5.501; 280/5.502; 280/5.503; 280/5.506; 280/5.507; 280/124.106; 280/124.107; 280/5.509; 280/5.511

(58) Field of Classification Search .............. 280/5.506, 280/5.507, 5.508, 5.509, 5.511, 124.106, 280/124.107
    See application file for complete search history.

(56) References Cited

U.S. PATENT DOCUMENTS

| | | | | |
|---|---|---|---|---|
| 3,533,425 A | * | 10/1970 | Hannan | 137/46 |
| 3,550,994 A | * | 12/1970 | Henry-Biabaud | 280/5.509 |
| 5,480,186 A | * | 1/1996 | Smith | 280/5.511 |
| 5,632,502 A | * | 5/1997 | Oppitz et al. | 280/124.106 |
| 5,794,966 A | * | 8/1998 | MacLeod | 280/5.507 |
| 6,003,880 A | * | 12/1999 | Kokotovic | 280/5.506 |
| 6,161,843 A | * | 12/2000 | Carleer | 280/5.508 |
| 6,257,603 B1 | * | 7/2001 | Busch et al. | 280/124.106 |
| 6,318,737 B1 | * | 11/2001 | Marechal et al. | 280/5.511 |
| 6,352,271 B1 | * | 3/2002 | Babcock | 280/124.1 |
| 6,361,033 B1 | * | 3/2002 | Jones et al. | 267/187 |
| 6,520,510 B1 | * | 2/2003 | Germain et al. | 280/5.511 |
| 6,651,991 B2 | | 11/2003 | Carlstedt | |
| 6,817,617 B2 | * | 11/2004 | Hayashi | 280/5.509 |
| 2004/0262858 A1 | * | 12/2004 | Ersoy | 280/5.511 |
| 2005/0110228 A1 | * | 5/2005 | Fujimori | 280/5.511 |

* cited by examiner

*Primary Examiner*—Christopher P Ellis
*Assistant Examiner*—Jacob Meyer
(74) *Attorney, Agent, or Firm*—Carlson, Gaskey & Olds

(57) ABSTRACT

A roll control actuator for a stabilizer bar includes an outer housing that is fixed to a first bar portion and a shaft that is fixed to a second bar portion. The shaft is helically connected to a piston that is received within an interior chamber formed inside the outer housing. The piston separates the interior chamber into first and second fluid chambers. An anti-rotation mechanism is fixed to the outer housing and cooperates with the piston to restrict the piston to axial movement relative to the outer housing. The first and second fluid chambers are selectively pressurized to control roll stiffness by moving the piston within the outer housing.

19 Claims, 2 Drawing Sheets

ROLL CONTROL ACTUATOR WITH PISTON ASSEMBLY

TECHNICAL FIELD

The subject invention relates to a roll control actuator for a stabilizer bar in a vehicle suspension that actively controls roll characteristics to provide desired roll stiffness during turning without adversely affecting ride quality.

BACKGROUND OF THE INVENTION

Vehicle suspension systems are used to absorb road load inputs and other vibrations to provide a smooth and comfortable ride. Vehicle suspension systems often include a stabilizer bar that is used to increase roll rigidity and improve steering stability. Typically, the stabilizer bar is connected to lower control arms, which are mounted to a wheel component, such as a knuckle. In this typical configuration, the stabilizer bar controls sway and provides a pull down force during turning maneuvers.

During a turn, a vehicle body has a tendency to roll to the outside of the turn. Suspension components on the outside of the turn are compressed while the suspension components on the inside of the turn are extended. The stabilizer bar helps to counter this motion by providing opposing input at each location. Thus, the stabilizer bar pushes up on collapsed components and compresses extended components during turning.

In order to provide a good ride quality it is desirable to control stiffness/compliance of the stabilizer bar. During turning maneuvers, it is desirable to increase the stiffness of the stabilizer bar to reduce the occurrence of vehicle rollover. However, if the stabilizer bar is too stiff, ride quality and handling characteristics can be compromised. Thus, it is desirable to have a stabilizer bar with variable stiffness to adjust for different driving conditions.

Different mechanisms for varying stiffness in a stabilizer bar have been proposed, including using variable clamping devices and solenoid controlled pin stops, for example. These mechanisms are often complex and expensive. Thus, there is a need for a simplified active control for selectively adjusting stiffness in a stabilizer bar.

SUMMARY OF THE INVENTION

A roll control actuator for a stabilizer bar in a vehicle suspension is used to connect first and second bar portions to each other. The roll control actuator includes an outer housing that is fixed to the first bar portion and a shaft that is fixed to the second bar portion. The shaft is connected to a piston that is received within an interior chamber formed inside the outer housing. The piston separates the interior chamber into first and second fluid chambers. An anti-rotation mechanism is fixed to the outer housing and cooperates with the piston to restrict the piston to axial movement relative to the outer housing, however, the shaft is able to rotate relative to the outer housing. The first and second fluid chambers are selectively pressurized to control roll stiffness by moving the piston within the outer housing.

The first and second fluid chambers define first and second fluid volumes, respectively. The first and second fluid volumes are generally equal to each other during straight-line driving conditions and are selectively pressurized to be different from each other during cornering maneuvers depending on turn direction. For example, a controller selectively pressurizes the first fluid chamber through a first port to control roll stiffness during a turning maneuver in a first direction and pressurizes the second fluid chamber through a second port to control roll stiffness during a turning maneuver in a second direction opposite of the first direction.

The piston includes a first piston head that defines the first fluid chamber and a second piston head that defines the second fluid chamber. A reduced area shaft portion interconnects the first and second piston heads. The reduced area shaft portion is spaced apart from the outer housing to form an intermediate chamber between the first and second fluid chambers. The anti-rotation mechanism includes a body portion that is positioned in the intermediate chamber and fixed to the outer housing. A plurality of rods is supported by the body portion. The rods extend between the first and second piston heads and cooperate with the body portion to restrict the piston to axial movement.

The piston includes an internal bore that receives the shaft. One end of the shaft is helically connected to the piston within the internal bore, such that the rod can rotate relative to the piston. The anti-rotation mechanism restricts the piston to axial movement within the interior chamber as the first and second fluid chambers are selectively pressurized to provide desired roll stiffness during turning maneuvers.

Accordingly, the subject invention provides a stabilizer bar with an active control that provides desired roll characteristics during cornering without adversely affecting vehicle ride. These and other features of the present invention can be best understood from the following specification and drawings, the following of which is a brief description.

DETAILED DESCRIPTION OF THE PREFERRED EMBODIMENT

Figure 1:
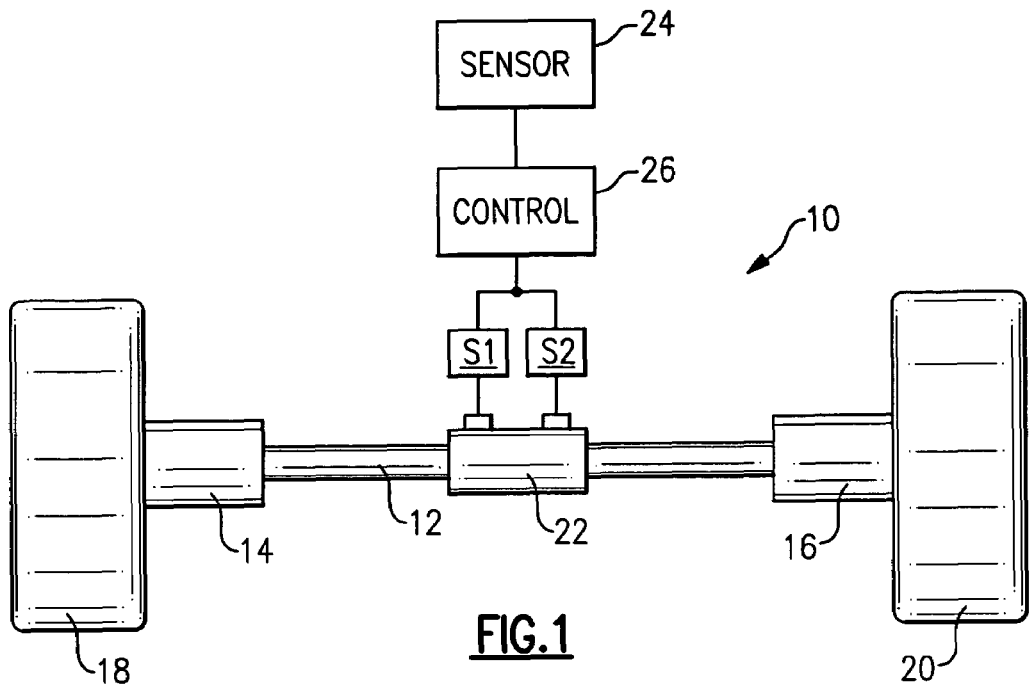
FIG. 1 is a schematic view of a vehicle suspension system with a stabilizer bar incorporating the subject invention.

A vehicle suspension system 10 is shown schematically in FIG. 1. The vehicle suspension system 10 includes a stabilizer bar 12 that has one end mounted to a first suspension component 14 and an opposite end mounted to a second suspension component 16. The first 14 and second 16 suspension components are coupled to first 18 and second 20 wheels, respectively. In one example, the first 14 and second 16 suspension components are lower control arms, however, it should be understood that the ends of the stabilizer bar 12 could also be supported by, or mounted to, other suspension components.

The vehicle suspension system 10 absorbs road load inputs and other vibrations to provide a smooth and comfortable ride. The stabilizer bar 12 is used to increase roll rigidity and improve steering stability. The stabilizer bar 12 includes a roll control actuator 22 that actively adjusts roll stiffness of the stabilizer bar 12 to provide desired roll characteristics for different driving conditions. The roll control actuator 22 can be used with any type of stabilizer bar 12, and the stabilizer bar 12 can be used in any type of suspension.

During vehicle operation, a sensor 24 monitors at least one ride parameter, such as lateral acceleration or yaw rate, for example. The sensor 24 communicates with a control 26 that detects when the ride parameter exceeds a threshold value. The control 26 then actuates the roll control actuator 22 to adjust stabilizer bar stiffness as needed. Any type of control 26 could be used to control pressurization. This will be discussed in greater detail below.

Figure 2:
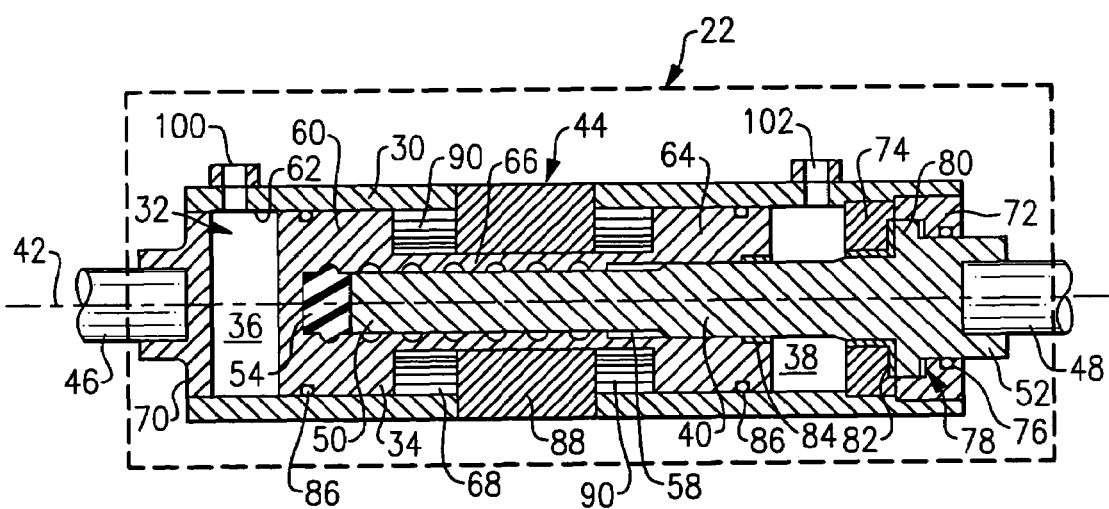
FIG. 2 is a cross-sectional view of a roll control actuator incorporating the subject invention.
Figure 3:
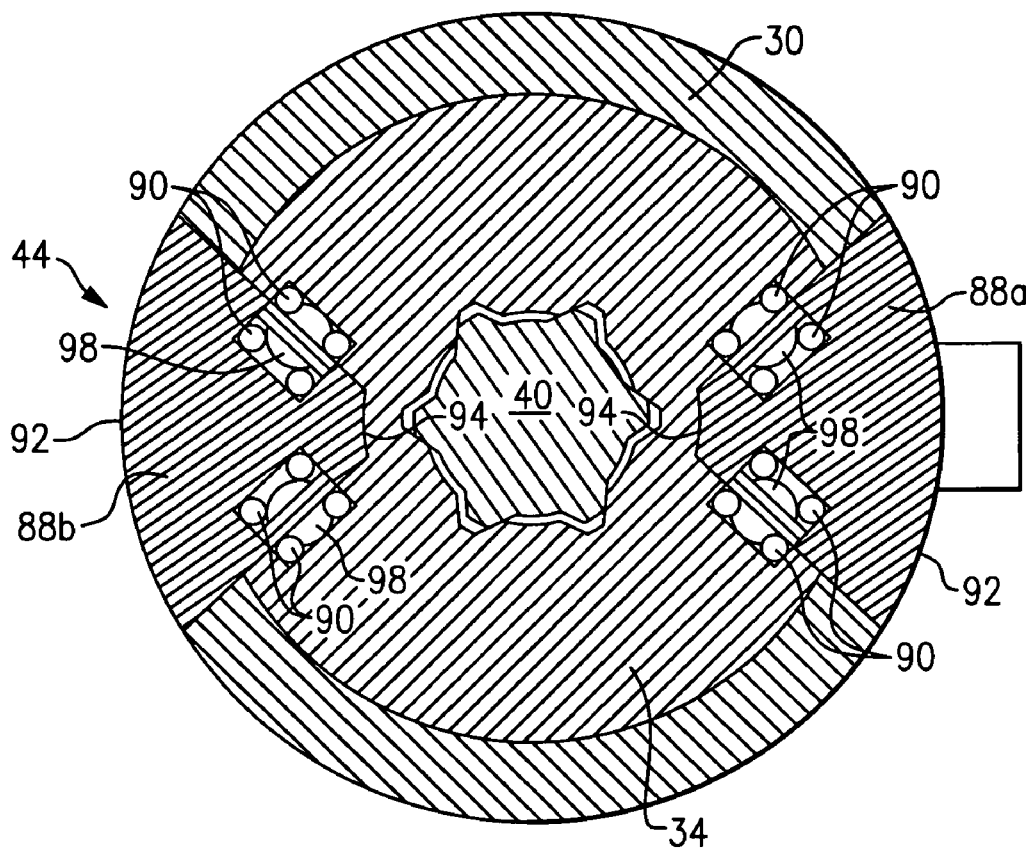
FIG. 3 is a cross-sectional view taken through an anti-rotation mechanism in the roll control actuator shown in FIG. 2.

The roll control actuator 22 is shown in greater detail in FIGS. 2-3. The roll control actuator 22 includes an outer housing 30 that defines an interior chamber 32. A piston 34 is received within the outer housing 30 and separates the interior chamber 32 into first 36 and second 38 fluid chambers. A shaft 40 is coupled to the piston 34 and defines a central axis 42. An anti-rotation mechanism 44 is fixed to the outer housing 30 and operates to restrict movement of the piston 34 to axial movement in a direction generally along the central axis.

The stabilizer bar 12 includes a first bar portion 46 that is fixed to the outer housing 30 and a second bar portion 48 that is fixed to the shaft 40. The shaft 40 has a first shaft end 50 that is coupled to the piston 34 and a second shaft end 52 that is fixed to the second bar portion 48. Preferably, the first shaft end 50 is helically connected at 54 to the piston 34 such that the shaft 40 can rotate about the central axis 42 relative to the piston 34. This helical connection 54 provides opposing rotation movement for the first 46 and second 48 bar portions. If the outer housing 30 and first bar portion 46 rotate about the central axis 42 in a first direction, then the shaft 40 and second bar portion 48 correspondingly rotate about the central axis 42 in an opposite direction.

The piston 34 includes a bore 58 that receives the shaft 40. The bore 58 includes a helical spline surface that engages a helical spine surface on the shaft 40. Anti-friction devices, such as ball bearings, for example, may be implemented at the helical point of connection to facilitate movement.

The piston 34 includes a first piston head 60 that slidably engages an inner surface 62 of the outer housing 30, a second piston head 64 that also slidably engages the inner surface 62, and a connecting portion 66 that connects the first 60 and second 64 piston heads. The connecting portion 66 has a reduced cross-sectional area compared to the first 60 and second 64 piston heads. The bore 58 in the piston 34 extends through the second piston head 64, through the connecting portion 66, and into the first piston head 60. Thus, a substantial length of the shaft 40 is received within the piston 34.

The connecting portion 66 is spaced from the inner surface 62 of the outer housing 30 to form a gap or intermediate chamber 68 that is positioned axially between the first 36 and second 38 fluid chambers. The anti-rotation mechanism 44 is positioned at least partially within the intermediate chamber 68.

The first piston head 60 defines the first fluid chamber 36 and the second piston head 64 defines the second fluid chamber 38. A first end cap 70 is fixed to one end of the outer housing 30 to enclose the first fluid chamber 36. The first bar portion 46 is preferably fixed to the first end cap 70. A second end cap 72 is fixed to the second shaft end 52 for movement relative to an opposite end of the outer housing 30. An inner end cap 74 is fixed to the inner surface 62 of the outer housing 30 to enclose the second fluid chamber 38. The second end cap 72 and inner end cap 74 cooperate with seal 76 to provide a sealed environment in the outer housing 30.

A first bearing 78 is positioned between the second end cap 72 and a flange portion 80 on the second shaft end 52. A second bearing 82 is positioned between the second shaft end 52 and the inner end cap 74. A third bearing 84 is positioned in the bore 58 between the shaft 40 and the second piston head 64. The first 78, second 82, and third 84 bearings cooperate to facilitate movement of the shaft 40 relative to the outer housing 30 and piston 34.

The first 60 and second 64 piston heads each include a seal 86 that engages the inner surface 62 of the outer housing 30. The seals 86 prevent fluid from leaking out of the first 36 and second 38 fluid chambers into the intermediate chamber 68.

As discussed above, the anti-rotation mechanism 44 is positioned within the intermediate chamber 68. The anti-rotation mechanism 44 includes a body portion 88 and a plurality of rods 90 that is supported by the body portion 88. The body portion 88 is fixed to the outer housing 30 and at least partially surrounds the connecting portion 66 of the piston 34. The plurality of rods 90 extends between first 60 and second 64 piston heads as shown in FIG. 2.

Figure 4:
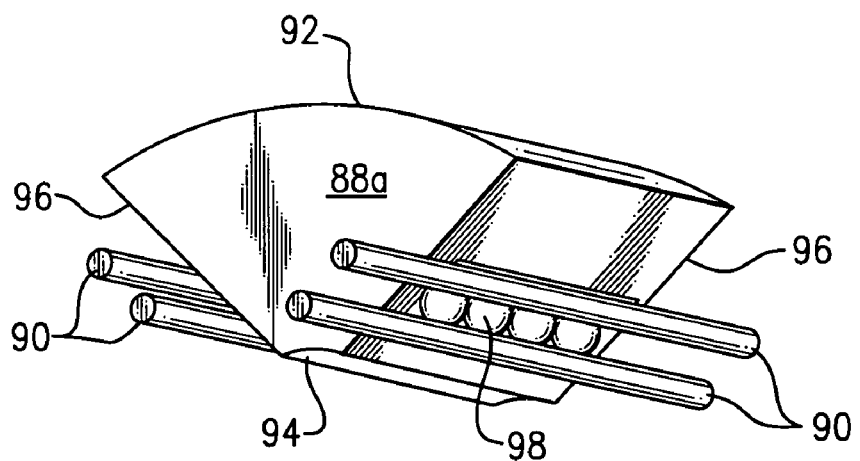
FIG. 4 is a perspective view of a portion of the anti-rotation mechanism.

The body portion 88 and rods 90 of the anti-rotation mechanism 44 are shown in greater detail in FIGS. 3 and 4. The body portion 88 is preferably comprised of at least first 88a and second 88b pie-shaped members that are fixed to the outer housing 30. The first 88a and second 88b pie-shaped members are preferably positioned opposite from each other as shown in FIG. 3.

Each pie-shaped member 88a, 88b includes an outer circumferential edge 92 and an inner circumferential edge 94. The outer circumferential edge 92 is defined by an arc length that is greater than that of the inner circumferential edge 94, which forms the pie-shape configuration. The outer circumferential edge 92 is generally aligned with an outer surface of the outer housing 30. The inner circumferential edge 94 engages the connecting portion 66 of the piston 34 at a sliding interface.

Side edges 96 (FIG. 4) connect the outer circumferential edges 92 to the inner circumferential edges 94. The rods 90 are supported on bearings 98 that are positioned along the side edges 96. The first 88a and second 88b pie-shaped members and the rods 90 cooperate to restrict and guide movement of the piston 34 in an axial direction along the central axis 42.

As shown in FIG. 2, the outer housing 30 includes a first port 100 that is in fluid communication with the first fluid chamber 36 and a second fluid port 102 that is in fluid communication with the second fluid chamber 38. The first fluid chamber 36 defines a first fluid volume and the second fluid chamber 38 defines a second fluid volume. During straight-line vehicle operation, the first and second fluid volumes are generally equal to each other. During execution of turning or cornering driving conditions, the control 26 pressurizes one of the first 36 or second 38 fluid chambers via one of the first 100 or second 102 fluid ports, to increase roll stiffness.

For example, the control 26 selectively pressurizes the first fluid chamber 36 through the first port 100 to control roll stiffness during a turning maneuver in a first direction and pressurizes the second fluid chamber 38 through the second port 102 to control roll stiffness during a turning maneuver in a second direction opposite of the first direction. If the first fluid chamber 36 is pressurized, the piston 34 moves axially to the right as shown in FIG. 2, which increases the fluid volume in the first fluid chamber 36 and reduces the fluid volume of the second fluid chamber 38. If the second fluid chamber 38 is pressurized, then the fluid volume in the first fluid chamber 36 decreased and the fluid volume of the second fluid chamber 38 is increased. Thus, depending on the direction of turn, the stiffness of the stabilizer bar 12 is easily and efficiently increased.

Once the cornering maneuver has been executed and straight-line driving conditions are again in effect, the appropriate first 36 or 38 fluid chamber is pressurized to equalize the first and second volumes by moving the piston 34. Self-centering devices such as coil springs (not shown) may be used within the first 36 and second 38 fluid volumes in conjunction with position sensors S1, S2 (FIG. 1) to facilitate control of movement of the piston 34 to a desired location.

The subject invention provides a roll control actuator 22 that selectively increases roll stiffness for turning, but which does not adversely affect ride quality. During straight-line driving there is no pressure through the first 100 and second 102 ports, which allows fluid to flow freely in and out of the first 36 and second 38 fluid chambers, improving ride quality. During a cornering maneuver, the control 26 selectively applies pressure through an appropriate one of the first 100 and second 102 ports to increase stiffness. If there is a control system failure, the first 100 and second 102 parts are automatically blocked to lock the roll control actuator 22 to prevent relative movement within the assembly.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A roll control actuator for a stabilizer bar in a vehicle suspension comprising:
   an outer housing adapted for attachment to a first stabilizer bar portion, said outer housing defining an internal cavity;
   a shaft adapted for attachment to a second stabilizer bar portion, said shaft extending into said internal cavity and defining a central axis;
   a piston received within said internal cavity and coupled to one end of said shaft, said piston separating said internal cavity into first and second fluid chambers; and
   an anti-rotation mechanism fixed to said outer housing to prevent said piston from rotating and to constrain said piston to translational movement in a direction along said central axis wherein said first and second fluid chambers are selectively pressurized to control roll stiffness by moving said piston relative to said outer housing.

2. The roll control actuator according to claim 1 wherein said first fluid chamber defines a first fluid volume and said second fluid chamber defines a second fluid volume, and wherein said first and second fluid volumes are generally equal to each other during straight-line driving conditions.

3. The roll control actuator according to claim 2 wherein said first and second fluid volumes are different from each other during cornering driving conditions.

4. The roll control actuator according to claim 1 wherein said one end of said shaft is helically connected to said piston to allow relative rotation between the first and second stabilizer bar portions.

5. The roll control actuator according to claim 1 wherein said piston includes a first piston head slidably engaging an inner surface of said outer housing to define said first fluid chamber and a second piston head slidably engaging said inner surface of said outer housing to define said second fluid chamber, said first and second piston heads being connected to each other with a center shaft portion.

6. The roll control actuator according to claim 5 wherein said center shaft portion has a reduced cross-sectional area compared to said first and second piston heads such that an intermediate chamber is formed between said inner surface of said outer housing and said center shaft portion.

7. The roll control actuator according to claim 6 wherein said anti-rotation mechanism is located at least partially within said intermediate chamber and comprises a body portion fixed to said outer housing and a plurality of rods supported by said body portion and extending between said first and second piston heads.

8. The roll control actuator according to claim 7 wherein said plurality of rods extend in a direction generally parallel to said central axis.

9. The roll control actuator according to claim 7 wherein said body portion at least partially surrounds said center shaft portion to provide a sliding interface between said center shaft portion and said anti-rotation mechanism.

10. The roll control actuator according to claim 7 wherein said body portion comprises a first pie-shaped member fixed to said outer housing at one side of said center shaft portion and a second pie-shaped member fixed to said outer housing at an opposite side of said center shaft portion.

11. The roll control actuator according to claim 1 wherein said outer housing includes a first port in fluid communication with said first fluid chamber and a second port in fluid communication with said second fluid chamber, and wherein a control selectively pressurizes said first fluid chamber through said first port to control roll stiffness during a turning maneuver in a first direction and pressurizes said second fluid chamber through said second port to control roll stiffness during a turning maneuver in a second direction opposite of the first direction.

12. A vehicle suspension comprising:
   a stabilizer bar having a first bar portion adapted for connection to a first wheel and a second bar portion adapted for connection to a second wheel laterally spaced from the first wheel;
   an actuator coupling said first bar portion to said second bar portion, said actuator including an outer housing defining an internal cavity and being attached to said first bar portion, a shaft attached to said second bar portion, and a piston received within said internal cavity and being directly coupled to one end of said shaft, said piston separating said internal cavity into first and second fluid chambers that are selectively pressurized to control roll stiffness, and said actuator including an anti-rotation mechanism fixed to said outer housing to prevent said piston from rotating and to restrict said piston to axial movement; and
   a control that pressurizes said first fluid chamber to control roll stiffness during a turning maneuver in a first direction and pressurizes said second fluid chamber to control roll stiffness during a turning maneuver in a second direction opposite of the first direction.

13. The vehicle suspension according to claim 12 wherein said piston includes a first piston head slidably engaging an inner surface of said outer housing to define said first fluid chamber and a second piston head slidably engaging said inner surface of said outer housing to define said second fluid chamber, said first and second piston heads being connected to each other with a reduced diameter portion.

14. A vehicle suspension comprising:
   a stabilizer bar having a first bar portion adapted for connection to a first wheel and a second bar portion adapted for connection to a second wheel laterally spaced from the first wheel;
   an actuator coupling said first bar portion to said second bar portion, said actuator including an outer housing fixed to said first bar portion, a shaft fixed to said second bar portion, a piston coupled to one end of said shaft, and an anti-rotation mechanism fixed to said outer housing to restrict said piston to axial movement, said piston being received within an internal cavity formed within said outer housing to separate said internal cavity into first and second fluid chambers that are selectively pressurized to control roll stiffness, and wherein said piston includes a first piston head slidably engaging an inner surface of said outer housing to define said first fluid chamber and a second piston head slidably engaging said inner surface of said outer housing to define said second fluid chamber, said first and second piston heads being connected to each other with a reduced diameter portion, and wherein said piston includes an internal bore that receives said shaft, wherein said internal bore extends through said second piston head, through said reduced diameter portion, and into said first piston head; and a control that pressurizes said first fluid chamber to control roll stiffness during a turning maneuver in a first direction and pressurizes said second fluid chamber to control roll stiffness during a turning maneuver in a second direction opposite of the first direction.

15. The vehicle suspension according to claim 14 wherein said one end of said shaft is helically connected to said piston within said internal bore.

16. A vehicle suspension comprising:

a stabilizer bar having a first bar portion adapted for connection to a first wheel and a second bar portion adapted for connection to a second wheel laterally spaced from the first wheel;

an actuator coupling said first bar portion to said second bar portion, said actuator including an outer housing fixed to said first bar portion, a shaft fixed to said second bar portion, a piston coupled to one end of said shaft, and an anti-rotation mechanism fixed to said outer housing to restrict said piston to axial movement, said piston being received within an internal cavity formed within said outer housing to separate said internal cavity into first and second fluid chambers that are selectively pressurized to control roll stiffness, and wherein said piston includes a first piston head slidably engaging an inner surface of said outer housing to define said first fluid chamber and a second piston head slidably engaging said inner surface of said outer housing to define said second fluid chamber, said first and second piston heads being connected to each other with a reduced diameter portion, and wherein said anti-rotation mechanism comprises a body portion fixed to said outer housing and a plurality of rods that are supported by said body portion and extend between said first and second piston heads; and a control that pressurizes said first fluid chamber to control roll stiffness during a turning maneuver in a first direction and pressurizes said second fluid chamber to control roll stiffness during a turning maneuver in a second direction opposite of the first direction.

17. The vehicle suspension according to claim 12 wherein said first fluid chamber defines a first fluid volume and said second fluid chamber defines a second fluid volume, and wherein said first and second fluid volumes are generally equal to each other during straight-line driving conditions and are different from each other during cornering driving conditions.

18. The roll control actuator according to claim 1 wherein said piston includes a bore and wherein one end of said shaft is directly received within said bore.

19. The roll control actuator according to claim 18 wherein said bore includes a helical spline surface that engages a corresponding helical spine surface on said shaft.

* * * * *